United States Patent [19]

Myers et al.

[11] 4,410,189

[45] Oct. 18, 1983

[54] RESILIENT SEAL RING ASSEMBLY WITH SPRING MEANS APPLYING FORCE TO WEDGE MEMBER

[75] Inventors: William N. Myers, Huntsville, Ala.; Leopold A. Hein, Flintville, Tenn.

[73] Assignee: The United States of America as represented by the Administrator of the National Aeronautics and Space Administration, Washington, D.C.

[21] Appl. No.: 378,533

[22] Filed: May 13, 1982

[51] Int. Cl.³ .............................................. F16J 15/18
[52] U.S. Cl. ................................. 277/117; 277/124; 277/164; 277/190; 277/205
[58] Field of Search ................... 277/102, 116.2, 116.6, 277/116.8, 117–122, 124, 142, 164, 186, 190, 205, 206 R, 212 R, 212 C

[56] References Cited

U.S. PATENT DOCUMENTS 954,195  4/1910  Law ................................. 277/205 X
1,844,409  2/1932  Rypinski ......................... 277/117 X
4,103,909  8/1978  Hoffman et al. ............. 277/116.2 X

FOREIGN PATENT DOCUMENTS 1231507  12/1966  Fed. Rep. of Germany ...... 277/190
428006  5/1935  United Kingdom ................ 277/205
2030237  4/1980  United Kingdom ................ 277/124

Primary Examiner—Robert S. Ward, Jr.
Attorney, Agent, or Firm—Joseph H. Beumer; John R. Manning; Leon D. Wofford, Jr.

[57] ABSTRACT

A ring seal (11) adapted for installation in an annular recess (13) between a housing (15) and a rotating or reciprocating shaft (17). The seal (11) consists of a resilient ring cup member (19) having a ring wedge member (21) inserted in the center recess (25) of the cup member (19) to wedge the opposing lips (29) and (31) of the cup member (19) outwardly into a sealing relationship. A spring (23) maintains the force against the wedge member (29).

7 Claims, 5 Drawing Figures

RESILIENT SEAL RING ASSEMBLY WITH SPRING MEANS APPLYING FORCE TO WEDGE MEMBER

DESCRIPTION

ORIGIN OF THE INVENTION

The invention described herein was made by employees of the United States Government and may be manufactured and used by or for the Government of the United States of America for governmental purposes without the payment of any royalties thereon or therefor.

TECHNICAL FIELD

This invention relates to a seal ring for a movable shaft relative to an outer housing and more specifically to a unitary annular ring assembly having three interlocking and cooperative portions which may easily be handled and installed in an annular recess to provide a positive and effective seal.

BACKGROUND ART

In cryogenic applications it has been found that commonly available cup or lip ring seals even when spring loaded suffer from leakage at low pressures because the sealing force provided by the spring is often used up by the cold flow of the seal. Cold flow is peculiar to fluorocarbons in that when the material is compressed over a prolonged period of time, it will flow in some available space losing some of its spring-force obtained during compression. Also, in the commonly available ring seals the outer diameter lip is in tension while the inner is in compression and this results in a waviness of the inner lip which the low working pressure is unable to correct.

While improvements in ring seal assemblies having a wedge member to spread the lips of a cup seal to assure a continuous fluid-tight contract has been recognized as shown in British Pat. No. 757,225 to George Osloff et al and U.S. Pat. No. 4,160,551 to J. D. Nixon, et al, the cooperating wedge member and cup were not of a construction which could be handled before installation in a unitary manner but of separate parts which needed to be assembled in place.

DISCLOSURE OF INVENTION

The seal of the present invention has a unitary character while although made of three interlocking or integral parts may be handled and placed in the seal slot between members as a single entity. The primary sealing member is a resilient ring cup having a generally rectangular cross-section with its center recess having inwardly annular sloping sides. A ring wedge member extends into the center recess and has projecting ribs along its annular sides which extends into annular, elongated slots within the sides of the center recess so as to interlock the two members. The slots have a width to allow the wedge member to be positioned in an upper and unstressed position before installation so the primary sealing member may easily be placed within a seal slot, and a lower position in which the wedge member forces the opposing lips of the primary sealing member outwardly into a sealing relationship with the interface members. The upper end of the wedge member either has a spring member integral or attached thereto to provide continuous force on the wedge member when placed in the seal slot.

Accordingly, it is a principal object of the invention to provide an effective ring seal which can easily be installed and handled.

Another object is to provide a cup seal having a wedge member with the spring means integral or attached thereto for loading the seal in its installed position.

DETAILED DESCRIPTION OF THE INVENTION

Figure 1:
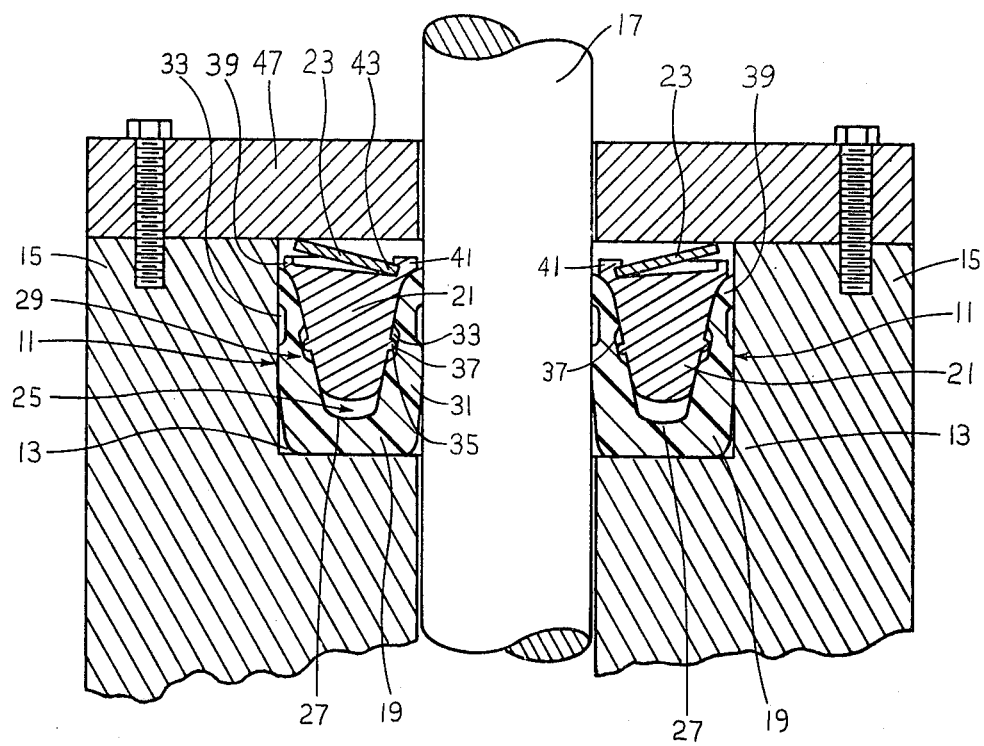
FIG. 1 is a sectional view illustrating the ring seal of the present invention installed.

As illustrated in FIG. 1, the ring seal 11 of the present invention is installed in an annular recess 13 for sealing the interface between the housing 15 and a rotating or reciprocating shaft 17. The ring seal 11 consists of a resilient ring cup member 19 having a metal ring wedge member 21 acting thereon by a Belleville spring 23.

The ring cup 19 is made of an elastomer or fluorocarbon but could be made of metal if sufficiently thin walled. Fluorocarbons and some soft metals such as copper and silver are compatible with cryogenics. The center recess 25 of the cup slopes inwardly from its upper end to a bottom 27 so as to receive the wedge member 21 and to define opposing lips 29 and 31 which when pressed outwardly by the wedge member engages and seals the interface members 15 and 17. A longitudinal, annular notch 33 on each side surface of the cup 19 adjacent its upper end serves to concentrate the force provided by the wedge member 21 first on the side surface between the notch and upper end which initially engages the adjacent surface.

Figure 2:
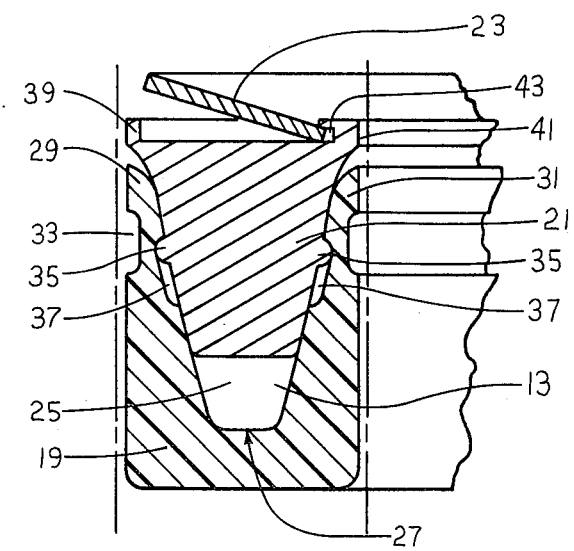
FIG. 2 is a sectional view of the ring seal before installation.

The ring wedge member 21 has an elongated, annular projecting rib 35 on each sloping side surface which projects into elongated annular slots 37 along the sides forming the recess 13 in the cup member 19. The slots 37 are sufficiently wide so as to allow the wedge member 31 to be interlocked therewith when the seal 11 is not installed and yet allow the sides of the ring cup member 19 to be unstressed and parallel as shown in FIG. 2 whereby the seal 11 may easily be installed in the recess 13 between the housing 15 and shaft 17. Thus, the projecting ribs 35 are adjacent the upper end of the slots 33 as shown in FIG. 2 prior to installation and adjacent the lower end of the slots 33 after installation as shown in FIG. 1. The inward slope of the wedge member 21 sides is slightly less than the corresponding slope of the abutting sides of the cup recess 25 so as to provide the spreading action, caused by the wedge member 21 as it is pushed into the cup recess 25 during installation, which pushes the lips 29 and 31 outwardly, upper end first, into a sealing relationship. The cross-section area of the wedge member is greater than the cross-section area of the recess.

The top side of the wedge member 21 has parallel annular upper edge rims 39 and 41 and the inner rim 41 is thicker than the other to accommodate a small rectangular shaped recess 43. The Belleville metal spring 23 has its inner edge inserted into the recess 43 and is frictionally gripped so as to lock the spring 23 to the wedge member 19. When installed, the spring 23 is biased against the abutting member 47 as shown in FIG. 1 to force the wedge member 21 into the cup recess 25 and to maintain the force in those instances when cold flow occurs.

Figure 3:
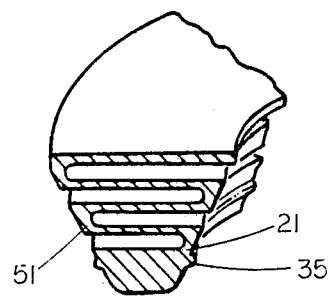
FIGS. 3 and 4 are cross-sections of modified wedge members having an integral spring member.
Figure 4:
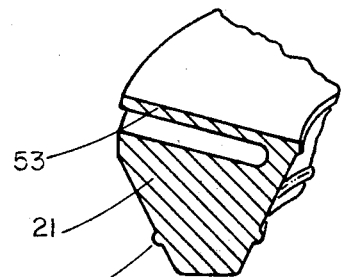

The wedge member 21 can be modified as illustrated by FIG. 3 to have an integral spring 51 having a sinuous shape with three loops starting from the upper outer edge. Another modification of the wedge member 21 is shown in FIG. 4 wherein the upper surface is in the form of a Belleville spring 53 which is integrally joined to the upper outer edge.

Figure 5:
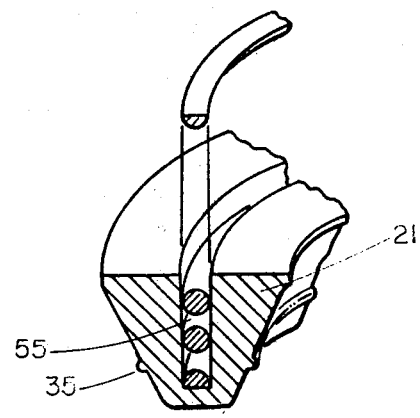
FIG. 5 is a cross-section of a modified wedge member with a coil spring.

A different modification is illustrated in FIG. 5 in which the wedge member 21 is provided with a narrow center, parallel sided annular recess 55 extending from its upper surface and an annular coiled spring 57 is inserted therein and frictionally gripped by the recess sides of wedge member. The coil spring 57 extends above the upper surface of the wedge member 21 an is calibrated to provide that force necessary when installed to force the wedge member 21 into the cup recess previously discussed.

It is readily apparent that other modifications could also be made to the seal, without departing from its essential characteristics.

We claim:
1. An improved ring seal for sealing the interface between a moving shaft and a housing, comprising;
   a resilient ring cup having an annular center recess extending from its upper end and sloping inwardly to a bottom so as to define inner and outer lips from the sides of the ring cup;
   a ring wedge member positioned within said annular recess and adapted to be shifted between an upper position and a lower position;
   each annular side forming said annular recess having a slot therein extending from said annular recess;
   said wedge member having annular inwardly sloping sides with a projecting rib on each side;
   said projecting ribs positioned within the slots on the sides of said annular recess;
   said ring cup member having substantially annular, parallel outer sides when in an unstressed condition;
   said annular recess slots having a width so as to allow the wedge member to be positioned in an upper position within said annular recess which does not stress the outer sides of the ring cup member and to be positioned in a lower position which forces the inner and outer lips outwardly into tight sealing engagement with the shaft and housing; and
   a spring means secured to the wedge member for applying a force urging the wedge member into its lower position within said annular recess when installed;
   the annular sloping sides of said wedge member having an inward slope less than the interfacing slope of the sides of said annular recess so as to provide a wedging action which forces the inner and outer lips of the ring cup outwardly into sealing engagement when the wedge member is shifted from its upper position to a lower position.

2. An improved ring seal according to claim 1 wherein said wedge member has a rim along its outer edge with a narrow rectangular recess therein; and
   said spring means in a Belleville spring having its outer edge positioned within the said rim recess.

3. An improved ring seal according to claim 1 wherein
   said spring means is an integral sinuous shaped portion having three loops.

4. An improved ring seal according to claim 1 wherein
   said spring means is integral with the upper edge of said wedge member and is shaped in the form of a Belleville spring.

5. An improved ring seal according to claim 1 wherein
   said wedge member has a narrow elongated, annular, center recess extending from its upper end; and
   said spring means is an annular coil spring held at its lower portion within said elongated center recess of the wedge member and extending beyond the upper end of said wedge member.

6. A seal for effectively sealing the interface between two members comprising;
   a resilient cup member having an elongated center recess extending from its upper end and sloping inwardly to a bottom;
   a wedge member positioned within said center recess and adapted to be shifted between an upper position and a lower position;
   each side forming the elongated center recess of said cup member having an elongated slot therein extending from said center recess;
   said wedge member having inwardly sloping sides with a projecting rib on each side;
   said projecting rib positioned within the slots on the sides of said center recess as to interlock the cup member and wedge member together;
   said cup member having substantially parallel outer sides when in an unstressed condition;
   said elongated slots in the sides forming the center recess of the cup member having a width to permit the wedge member to be placed in an upper position within said center recess which does not stress the outer sides of the cup member, and to be placed in a lower position which forces the outer sides of the cup member outwardly into sealing relationship, upper end first, when the wedge member is repositioned from its upper position to its lower position; and
   spring means secured to the wedge member for applying a force urging the wedge member into its lower position when installed.

7. A seal according to claim 6 wherein:
   said spring means is an integral sinuous shaped portion having three loops.

* * * * *